United States Patent [19]
Gariboldi et al.

[11] Patent Number: 5,481,221
[45] Date of Patent: Jan. 2, 1996

[54] CHARGE PUMP CIRCUIT FOR LOW SUPPLY VOLTAGE APPLICATIONS

[75] Inventors: Roberto Gariboldi, Lacchiarella; Francesco Pulvirenti, Acireale, both of Italy

[73] Assignees: SGS-Thomson Microelectronics S.r.l., Agrate Brianza; Co.Ri.M. Me., Catania, both of Italy

[21] Appl. No.: 197,077

[22] Filed: Feb. 16, 1994

[30] Foreign Application Priority Data

Feb. 17, 1993 [EP] European Pat. Off. .............. 93830059

[51] Int. Cl.$^6$ .................................................. G05F 1/10
[52] U.S. Cl. ............................................ 327/536; 327/530
[58] Field of Search ................................. 307/264, 246, 307/296.1, 296.2, 270, 578, 576, 511, 110; 363/60, 147; 327/534, 536, 537, 538, 544

[56] References Cited

U.S. PATENT DOCUMENTS

| | | | |
|---|---|---|---|
| 3,851,258 | 11/1974 | Freedman | 328/63 |
| 4,068,295 | 1/1978 | Portmann . | |
| 4,616,303 | 10/1986 | Mauthe . | |
| 4,621,315 | 11/1986 | Vaughn et al. | 363/60 |
| 4,669,089 | 5/1987 | Gahagan et al. | 375/1 |
| 4,809,152 | 2/1989 | Bingham et al. | 363/61 |
| 5,038,325 | 8/1991 | Douglas et al. | 365/189.06 |
| 5,051,882 | 9/1991 | Grimm et al. | 363/60 |
| 5,196,996 | 3/1993 | Oh | 363/60 |

FOREIGN PATENT DOCUMENTS

| | | | |
|---|---|---|---|
| 0135889 | 4/1985 | European Pat. Off. | H02M 7/25 |
| 0349495 | 1/1990 | European Pat. Off. | G11C 5/00 |
| 2321144 | 3/1977 | France | G04C 3/00 |

OTHER PUBLICATIONS

Proceedings Of The 32nd Midwest Symposium On Circuits And Systems Aug. 1989, Champaign, Ill., pp. 680–684, Ramesh Patnaikuni, et al., "Design and Analysis of An Optical–Powered On–Chip Power Supply".

*Primary Examiner*—Timothy P. Callahan
*Assistant Examiner*—Kenneth B. Wells
*Attorney, Agent, or Firm*—David M. Driscoll; James H. Morris; John N. Anastasi

[57] ABSTRACT

A charge pump circuit includes a pair of series switching devices coupled between an output node of the circuit and an input node. A power stage drives a charge transfer capacitor which is coupled to an intermediate node between the series switching devices. The power stage has an input coupled to the input node of the circuit. The power stage further includes a bootstrap capacitor for maintaining a conductive state during an entire half of a cycle of a period of oscillation of a local oscillator. The series switching devices may be driven in phase opposition by either a CMOS invertor or a pair of comparators.

23 Claims, 3 Drawing Sheets

CHARGE PUMP CIRCUIT FOR LOW SUPPLY VOLTAGE APPLICATIONS

BACKGROUND OF THE INVENTION

1. Field of the Invention

The present invention concerns a charge pump circuit for implementing a voltage multiplier in integrated circuits operating with a relatively low supply voltage. The circuit is particularly suited for driving a high-side driver power device of a half-bridge output stage employing integrated DMOS transistors.

2. Discussion of the Related Art

Integration in the same chip of complex systems often composed of distinct circuit sections that are necessarily realized with structurally and functionally different devices, erasing and programming of read only memory cells, optimization of the driving conditions of integrated power devices in a half-bridge configuration, require or benefit from the availability of a biasing or driving voltage higher than the supply voltage of the integrated circuit. Often these requirements are satisfied by integrating special voltage multiplying circuits capable of producing, on an output ballast capacitance (storage capacitance) a voltage that is higher than the supply voltage (VCC). These circuits are commonly referred to as voltage multipliers or charge pump circuits.

A basic diagram of a charge pump circuit is depicted in FIG. 1.

Basically, the capacitor C2 stores electric charge that is fed thereto by transferring (pumping) the charge momentarily stored in a transfer capacitance C1 through a transfer diode D2. The intermittent charging of C1 through a diode D1 connected to VCC, and the discharging of the electric charge stored therein into the output capacitance C2, are controlled by a free-running local oscillator (OSC LDC)10. At steady state, the circuit operates as follows.

During an initial half cycle, the output of the local oscillator 10 is low and the capacitance C1 charges through the diode D1 to a voltage given by: VCC−Vd, where Vd represents the voltage drop across the charge diode D1. In the following half cycle, the output of the oscillator goes to a voltage VR, the node A assumes the voltage given by: VCC+VR−Vd, and the capacitance C1, discharges the electric charge that was stored therein during the preceding half cycle in the output storage capacitance C2. The capacitance C2, assumes the voltage VCP given by the following relation:

$$VCP = VCC + VR - 2 \cdot Vd$$

It may be observed that for: VR=VCC, the circuit becomes substantially a voltage duplicator and provides an output voltage equal to twice the supply voltage less the voltage drop across the diodes.

Of course, the circuit may be composed of N basic circuit modules, in order to obtain an output voltage that is N-times the supply voltage less N-times the ohmic drop across a diode.

A practical embodiment of this type of circuit is depicted in FIG. 2. A regulated reference voltage VR is obtained, in the most simple case, by using a common voltage regulating stage composed of the transistor Q1, the resistor R1, the diode D3 and the Zener diode DZ1. By considering the voltage across the direct biased base-emitter junction of transistor Q1, given approximately by: Vbel=Vd3, where Vd3 is the voltage across the diode D3, the regulated voltage VR will be given by the following relations:

$$VR = VZ \qquad \text{for } VCC > VZ + Vdrop$$
$$VR = VCC - Vdrop \qquad \text{for } VCC < VZ + Vdrop$$

where VCC is the supply voltage, VZ is the Zener voltage and Vdrop is the sum of the junction voltage Vbel and of the voltage drop across the resistance R1 due to the current absorbed by the base of the regulating transistor Q1.

In a typical circuit as depicted in FIG. 2, Vdrop is about 1.2 V. However in a large number of applications, a relatively high current may be required and therefore the transistor Q1 is often replaced by a Darlington pair. In this last instance, Vdrop is about 2 V.

The voltage regulating stage provides a regulated supply to the local oscillator 10 and to the power stage that is made up of the two MOS transistors M1 and M2. The power stage has the function of driving the charge and discharge of the pump capacitance C1. When the load connected to an output (VCP) of a multiplied voltage source is relatively heavy and/or the transistors that are connected to the VCP line switch at a high frequency, relatively large capacitances are needed both for C1 (on the order of 10 nF) and for C2 (several hundreds of nF). As a consequence, the power stage (M1–M2) must be capable of delivering relatively large peaks of current (in the order of ten mA). The drawbacks of a conventional circuit configuration as the one described above are the following:

a) throughout the range of the supply voltage, the voltage drop across the transfer diodes D1 and D2 (equivalent to about 1.4 V) is "subtracted" from the output voltage VCP, as may be observed by considering the following relation:

$$VCP = VCC + VZ - 2 \cdot Vd \qquad \text{for } VCC > VZ - Vdrop;$$

b) For a relatively low supply voltage (e.g. VCC<VZ+ Vdrop), the voltage drop across the voltage regulator (Vdrop=2 V) subtracts from the available output voltage VCP, as may be observed from the following relation:
VCP=2*VCC−Vdrop−2Vd for VCC<VZ+Vdrop; Both voltage drops contribute to limit the efficiency of the circuit when operating with a low supply voltage;

c) The current driving the pump capacitance C1, which may have relatively large peaks is drawn from the regulated voltage line VR. This implies the need of properly designing the voltage regulator, to that is, employing large size components.

SUMMARY OF THE INVENTION

An objective of the present invention is to provide a charge pump circuit that will maintain its efficiency with a low supply voltage and that will not require a high-current voltage regulating device.

This objective is accomplished by the circuit of the present invention. The circuit includes electric charge transfer devices that are switching elements which replace the diodes according to the prior art. As a result, the voltage drops across the charge transfer devices is substantially reduced. Moreover, by employing a half-bridge power stage, provided with a "bootstrap" capacitance, the voltage drop (Vdrop) across the voltage regulating stage is avoided.

In one embodiment, the two switches that replace the two charge transfer diodes to and from the pump capacitance C1, include a first series pair of complementary transistors, connected in phase opposition, and driven by a second CMOS pair of transistors (comprising an inverter). The state of conduction and of interdiction of the two complementary transistors forming the first CMOS pair of transistors is maintained for an entire half cycle of oscillation by the second CMOS pair (inverter) which, together with the first CMOS pair, constitute a bistable circuit, commonly referred to as a latch or flip-flop.

The half-bridge power stage is functionally connected between the supply node VCC and ground and may be formed with DMOS devices (e.g. with VDMOS transistors). The power device constituting the so-called the high-side driver of the half-bridge power stage is controlled by an inverting stage. The inverting stage is driven by the signal generated by the local oscillator and is functionally connected between the regulated voltage line and ground. Conversely, the other power device of the power stage (low-side driver) may be driven directly by the signal produced by the local oscillator.

BRIEF DESCRIPTION OF THE DRAWINGS

The different aspects and advantages of the circuit of the invention will become more evident through the following description of several important embodiments and by referring to the attached drawings, wherein.

DETAILED DESCRIPTION

Figure 1:
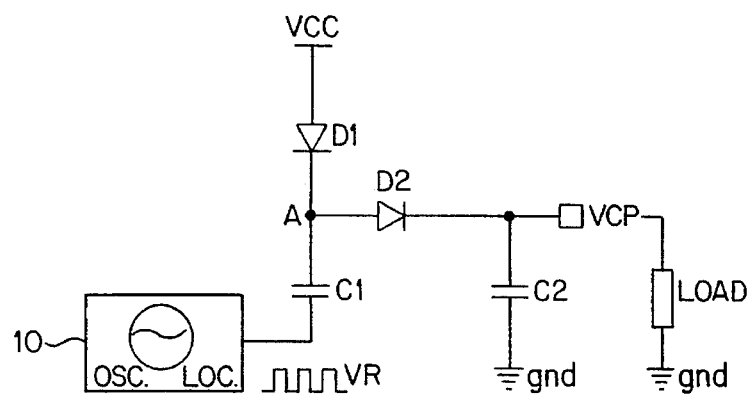
FIGS. 1 and 2 show a charge pump circuit according to the prior art, as described above.

By referring to the diagram of FIG. 3, the operation of the charge pump stage of the invention is as follows.

1. OPERATION OF THE POWER STAGE OF THE CHARGE PUMP CIRCUIT

During a first half cycle, when the output of the local oscillator 10 is high (at the regulated voltage VR), the power transistor M1 (high-side driver) is OFF and the power transistor M2 (low-side driver) is ON. Therefore, the output node M of the half-bridge power stage is at ground potential and the bootstrap capacitance Cb charges through the transistor Q2 to the regulated voltage VR present on the node R.

During the successive half cycle of oscillation, when the output of the oscillator commutes from the voltage VR to ground potential, M2 is switched-OFF and M1 is switched-ON, thus "shortcircuiting" the node R (to which the bootstrap capacitance Cb is connected) to the gate of M1, through the transistor M3. As a consequence, the output node M of the half-bridge stage takes a voltage VR' and the power transistor M1 is kept on during the entire half cycle by the charge stored in the bootstrap capacitance Cb. The voltage VR', assumed by the driving node M, will have the following values:

VR'=VZ+VBE for VCC>VZ+VBE

VR'=VCC for VCC<VZ+VBE

The transistor Q3 and the Zener DZ2 have the purpose of limiting the voltage on the node M to the value VR', given by the first one of the above-indicated equations. In fact, once the required voltage is reached (i.e. VZ+VBE), the transistor Q3 switches-OFF the power transistor M1, thus preventing an unnecessary consumption of current through the power transistor M1 itself.

2. Operation of the Charge Transfer Switches

Once the initial switch-ON transient period has terminated, the output charge storing capacitance C2 assumes a potential given by VCC−2.Vd', where Vd' represents the voltage drop across the "body" diode of a generic power MOS structure (if M7 and M8 are integrated in the same pocket, the starting voltage assumed by the capacitance C2 will be given by VCC−Vd", where Vd" represents the voltage drop across the "body" diode of the pocket).

As long as the voltage VCP−VCC remains lower than the threshold voltage of the CMOS transistors (M5, M6, M7 and M8), C2 will continue to charge through the diodes intrinsic to the integrated structure of the transistors M5 and M6. As soon as the voltage VCP-VCC becomes greater than the threshold voltage of the CMOS transistors, M5 and M6, driven by the inverting stage constituted by the CMOS pair M7 and M8, will conduct alternately, cooperating to "pump" electric charge in C2.

The steady state operation may be described as follows.

During the half cycle of oscillation when the driving node M is at ground potential, the capacitance C1 charges to VCC through the MOS transistor M5, which is kept ON by the inverting stage formed by the pair of CMOS transistors M7 and M8. In fact, the transistors M5, M6, M7 and M8 are configured in a positive reaction mode (i.e. in a configuration that implements substantially a latch or a flip-flop), and as a consequence, the condition M5on, M6on, persists until the next switching of the driving node M.

During the following half cycle, when the driving node M assumes the VR' potential, the electric charge that was stored in the transfer capacitance C1 during the preceding half cycle transfers thus charging it, into the output storage capacitance C2 through the transistor M6, which is maintained conducting during this half cycle and until a successive switching of the driving node M because of the positive reaction that is implemented through M7–M8.

From the above considerations, it may be verified easily that the output voltage VCP assumes the following values:

VCP=VCC+VZ+VBE for VCC>VZ+VBE

VCP=2*VCC for VCC<VZ+VBE

The above formulas are valid for purely capacitive loads.

Of course, when the current absorbed by the load has nonnegligible value, the internal ON-resistance of transistors M1, M2 and M5 and M6, must be taken into consideration.

The circuit of the invention has remarkable advantages as compared to the known circuits. The main advantages may be indicated as follows:

a) reduction of the maximum (multiplied) output voltage by a quantity equivalent to the voltage drop across the transfer diodes of the known circuits can be avoided throughout the range of the supply voltage;

b) reduction of the maximum output voltage by a quantity equivalent to the voltage drop (Vdrop) through the voltage regulator, under conditions of low supply voltage, may be avoided too;

c) because the half-bridge, power stage made with the power transistors M1 and M2 is electrically connected to the supply line VCC, the high current peaks that occur for driving the transfer capacitance C1 no longer need to be drawn from the voltage regulator circuit.

Figure 4:
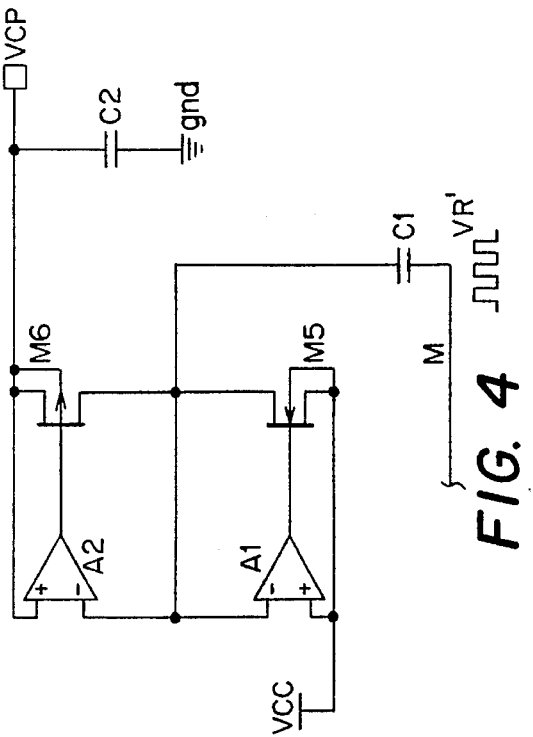
FIG. 4 is a partial schematic diagram of an alternative embodiment of the charge transfer devices.

According to an alternative embodiment of the circuit of the invention, depicted in FIG. 4, the efficiency of the circuit may be increased further.

Figure 2:
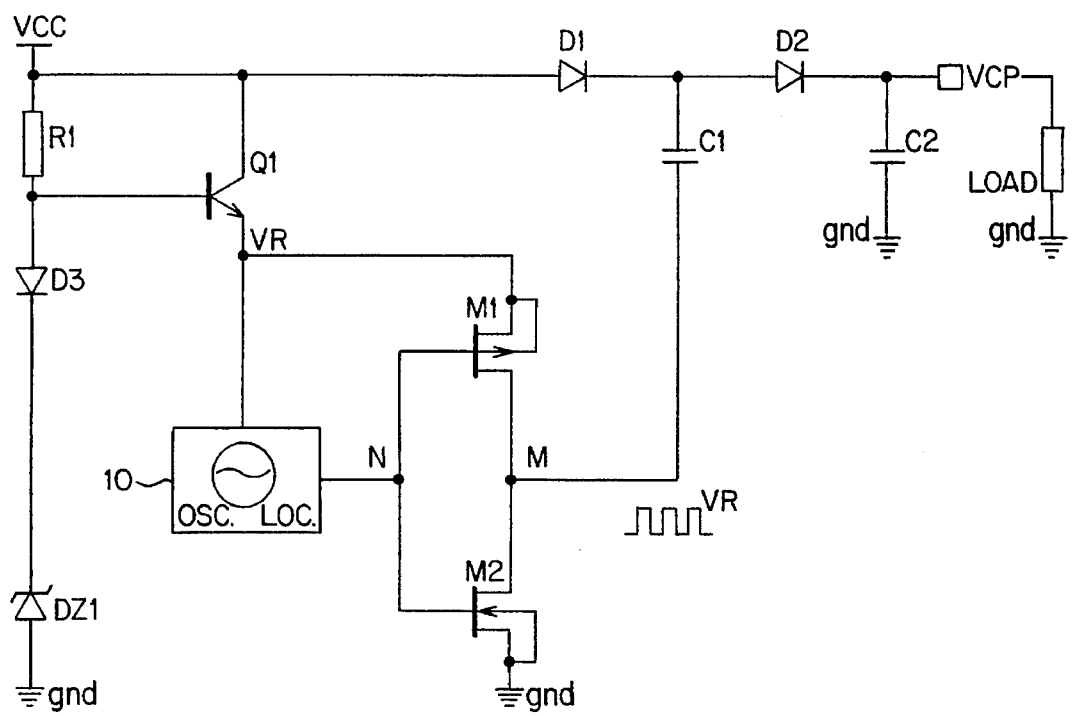

As schematically shown in the partial diagram of FIG. 4, the MOS transistors M5 and M6 that functionally replace the diodes D1 and D2 of the conventional circuits, as depicted in FIGS. 1 and 2, may be separately driven in order to avoid cross-currents and return currents at switchings. In practice this may implemented by employing two comparators: A1 and A2, or more simply two inverters, one having a low threshold for driving the N-channel transistor M5 and one having a high threshold for driving the P-channel transistor M6.

In case of integration of the charge pump circuit of the invention, it is recommended to place the transistors M5 and M6 into separate pockets and to bias the pocket of M5 to the bulk potential. Should M5 and M6 be in the same tub, or pocket, a parasitic bipolar transistor would discharge C2 in the half period while C1 is being charged, thus making it impossible to reach a steady state condition. Moreover, it is advisable to minimize the gain of the parasitic PNP transistor of the integrated structure of M6, as well as to minimize the parasitic capacitances of the R and S nodes of the circuit depicted in FIG. 3.

The charge pump circuit of the invention, illustrated above for a voltage "duplicator", may constitute a building block for realizing an N-order voltage multiplier, where N may be theoretically as large as desired.

Figure 3:
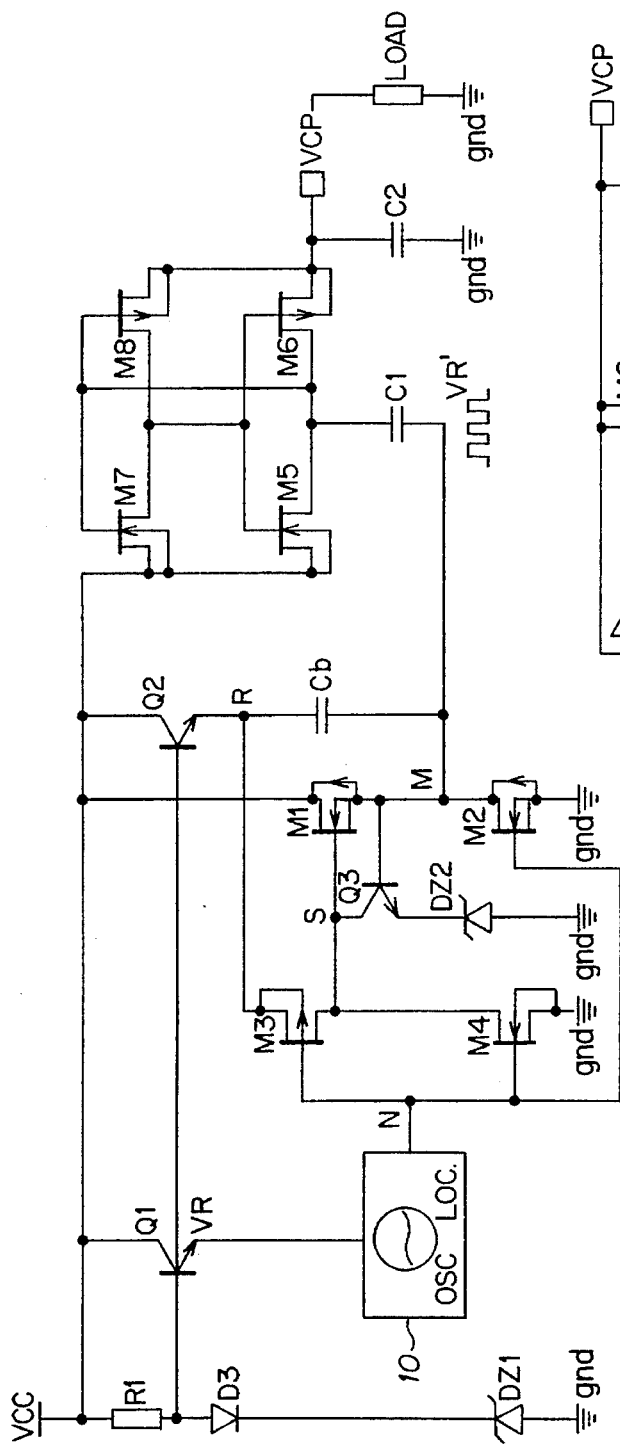
FIG. 3 shows a pump circuit made in accordance with the present invention.
Figure 5:
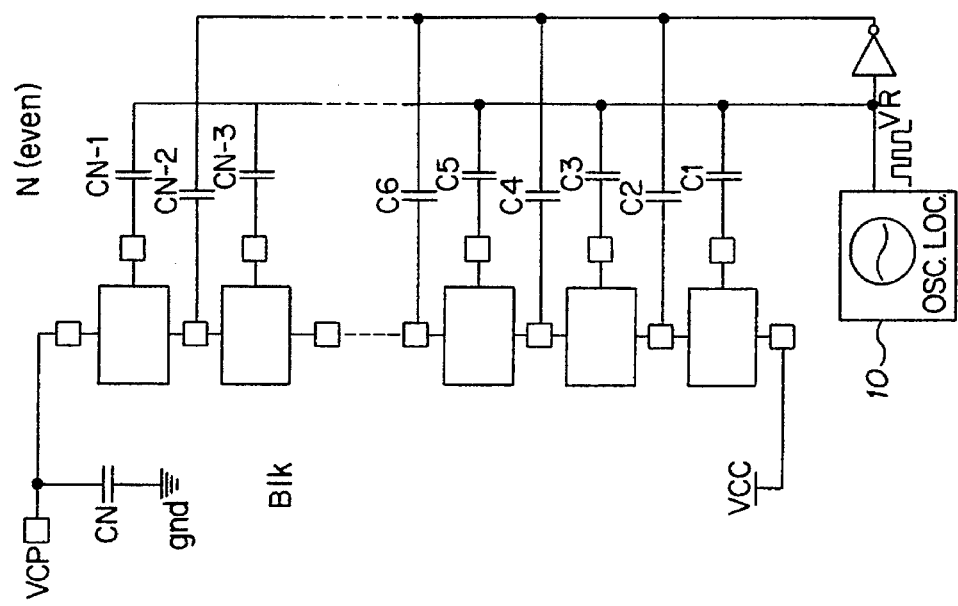
FIG. 5 is a block diagram of a voltage multiplier including an even number of the charge pump circuits of the present invention.

An N-even multiplier is depicted in FIG. 5, wherein each three-terminal block (Blk) may be constituted by a circuit such as the one composed of transistors M5, M6, M7 and M8 of FIG. 3, or by a circuit similar to the one composed of transistors M5 and M6 and of the respective driving threshold comparators A1 and A2 of FIG. 4.

Figure 6:
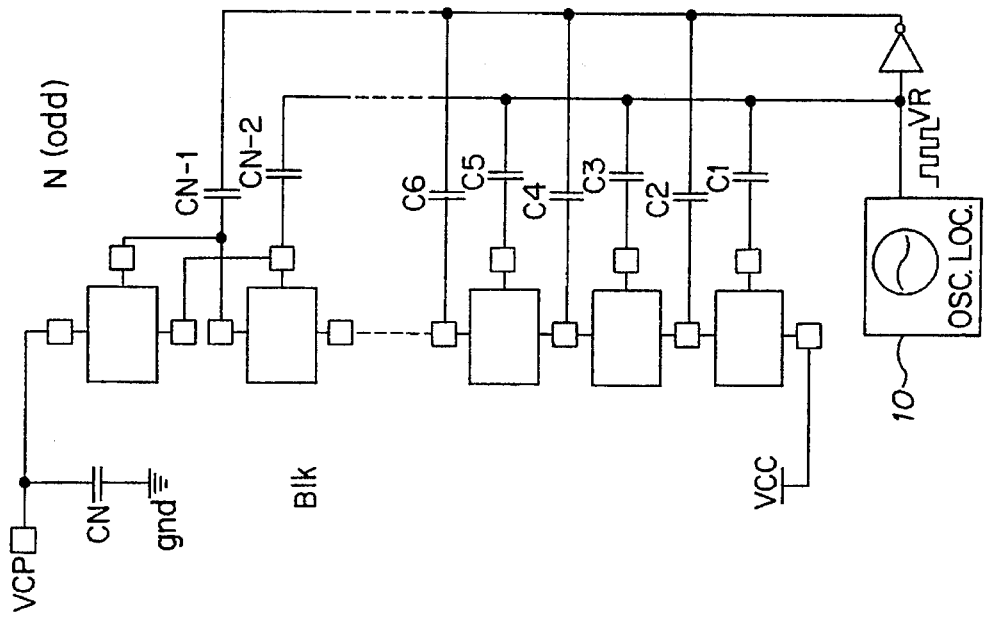
FIG. 6 is a block diagram of a voltage multiplier including an odd number of the charge pump circuits of the present invention.

An N-odd multiplier is depicted in FIG. 6, wherein each three-terminal block (Blk) may be a circuit such as the one composed of transistors M5, M6, M7 and M8 of FIG. 3, or a circuit such as the one composed of transistors M5 and M6 and of the respective driving threshold comparators A1 and A2 of FIG. 4.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A charge pump circuit comprising:

a storage capacitor, coupled between an output node of the charge pump circuit and a ground node;

two switching devices, connected in series between a supply node, coupled to a supply voltage, and said output node;

a charge transfer capacitor, coupled to an intermediate node between said two series switching devices and a driving node;

a voltage regulator, having an input coupled to the supply node, which provides a regulated voltage from the supply voltage and has a regulator output node for outputting the regulated voltage;

a driving oscillator for producing a local oscillation signal including a local oscillator output node for outputting the oscillation signal;

a power stage having an input coupled to the regulator output node and an output node which is said driving node, wherein said power stage is a half-bridge stage comprising a series combination of a high-side power transistor and a low-side power transistor;

an inverter having an input coupled to the local oscillator output node and an output coupled to a control terminal of the high side power transistor; and a bootstrap capacitor coupled between said driving node and said regulator output node.

2. The charge pump circuit as defined in claim 1, wherein said series connected switching devices are a pair of complimentary MOS transistors connected in series, each MOS transistor including a base connection, which controls the respective MOS transistor, and which is coupled to an output of an inverter having an input coupled to the intermediate node.

3. The charge pump circuit as defined in claim 2, wherein coupled to a the inverter has a respective triggering threshold for each of the two switching devices.

4. The charge pump circuit according to claim 1, wherein said power stage further comprises means for limiting a maximum voltage provided at said driving node.

5. The charge pump circuit as defined in claim 4, wherein said limiting means comprises a transistor and a Zener diode connected in series and coupled between the output mode of said inverter and the ground node, and wherein said transistor includes a control terminal that is coupled to said diving node.

6. The charge pump circuit as defined in claim 2, wherein the inverter comprises a pair of complementary MOS transistors connected in series between the supply node and the output node of the circuit.

7. The charge pump circuit as claimed in claim 1, wherein the pair of series connected switching devices are a pair of complementary MOS transistors which are formed in separate pockets of a semiconductor substrate, and wherein a first pocket, of the separate pockets, is biased to a bulk potential.

8. A voltage multiplier comprising:

a plurality of three-terminal devices, each having an input, an output and a driving terminal, wherein the plurality of three-terminal devices are connected in series between a supply node and an output node of the multiplier, wherein the driving terminal of each device is coupled to a first terminal of a charge transfer capacitor and wherein the output of each device is coupled to a first terminal of a storage capacitor, a second terminal of each of the charge transfer capacitor and the storage capacitor being coupled to a local oscillator signal;

each three-terminal device includes a pair of switching elements, each switching element having a control connection which controls the switching element, wherein the switching elements are connected in series between said input and said output of the three-terminal device, and wherein an intermediate node of connection between said switching elements is the driving terminal; and each three-terminal device including a means for driving said pair of switches in phase opposition in response to a signal present on said driving terminal.

9. A multiplier circuit as defined in claim 8, wherein said driving means is an inverter having an output coupled to each control connection and an input coupled to the intermediate node.

10. A multiplier circuit as defined in claim 8 wherein said driving means is a pair of series-connected threshold comparators, connected in series between the supply node and the output, of the multiplier, each threshold comparator having an output coupled to the respective control connection of the series switching elements.

11. The voltage multiplier circuit as claimed in claim 8, wherein the series connected switching elements are a pair of complementary MOS transistors which are formed in separate pockets of a semiconductor substrate, and wherein a first pocket, of the separate pockets, is biased to a bulk potential.

12. A charge pump circuit having an input node coupled to a voltage supply, and an output node, comprising:

means for storing a charge, coupled between the output node and ground;

a pair of means for switching, connected in series between the input node and the output node;

a second means for storing a charge, coupled to an intermediate node between the switching means and a driving node;

means for regulating the supply voltage having an input coupled to the input node, and having an output node for outputting a regulated voltage;

means for generating and outputting a local oscillator signal including an output node for outputting the local oscillation signal;

means for pumping power having an input coupled to the oscillator means output and an output coupled to the driving node; and a third means for storing a charge coupled between the driving node and the regulating means output node.

13. The charge pump circuit as claimed in claim 12, wherein the pumping means comprises a high side driving stage and a low side driving stage connected in series between ground and the regulator means output, each driving stage having a control terminal which controls the respective driving stage, the pumping means further comprising an inverting stage having an input coupled to the oscillator means output and an output coupled to the high side driver stage control terminal, and wherein the low side driver stage control terminal is coupled to the oscillator means output.

14. The charge pump circuit as claimed in claim 12, wherein each of said pair of means for switching includes a control connection which controls the respective switching means and is coupled to an output of a means for inverting, the means for inverting having an input coupled to the intermediate node.

15. The charge pump circuit as claimed in claim 12, wherein each of said pair of pair of means for switching includes a control connection which controls the respective switching means and is coupled to an output of a respective means for inverting, each means for inverting having a triggering threshold.

16. The charge pump circuit as claimed in claim 13, wherein the means for pumping power further comprises means for limiting a maximum voltage provided by the high side driving stage at the driving node, the means for limiting being coupled between the high side driving stage control terminal, the driving node and ground.

17. The charge pump circuit as claimed in claim 12, wherein the series connected switching means are a pair of complementary MOS transistors which are formed in separate pockets of a semiconductor substrate, and wherein a first pocket, of the separate pockets, is biased to a bulk potential.

18. A charge pump circuit having an input node coupled to a voltage supply, and an output node, comprising:

a storage capacitor, coupled between the output node and ground;

two switching elements, coupled between the input node and the output node;

a charge transfer capacitor, coupled to an intermediate node between the series switching elements and a driving node;

a power pumping stage, having an input coupled to a regulated voltage and an output coupled to the driving node, wherein the power pumping stage includes a high side driving stage and a low side driving stage connected in series between ground and the regulated voltage, each driving stage having a control terminal which controls the respective driving stage, and an inverting stage having an input coupled to a local oscillator signal and an output coupled to the high side driver stage control terminal, and wherein the low side driver stage control terminal is coupled to the local oscillator signal.

19. The charge pump circuit as claimed in claim 18, wherein the switching elements are a pair of complementary MOS transistors which are formed in separate pockets of a semiconductor substrate, and wherein a first pocket, of the separate pockets, is biased to a bulk potential.

20. A voltage multiplier circuit having an input node and an output node, comprising:

a plurality of means for switching, each having an input, an output and a control terminal, wherein the plurality of means for switching are connected in series between the input node and the output node of the multiplier circuit, wherein the control terminal of each means for switching is coupled to a first terminal of a first means for storing a charge and wherein the output of each means for switching is coupled to a first terminal of a second means for storing a charge, a second terminal of each of the first means for storing and the second means for storing being coupled to a local oscillator signal; and each means for switching including a means for driving each of the means for switching in response to a signal on the control terminal.

21. The multiplier circuit as claimed in claim 20, wherein the means for driving includes a means for inverting the signal and for outputting the inverted signal to each control terminal.

22. The voltage multiplier circuit as claimed in claim 20, wherein the plurality of switching means include a series connected pair of complementary MOS transistors formed in separate pockets of a semiconductor substrate, and wherein a first pocket, of the separate pockets, is biased to a bulk potential.

23. A method of producing an output voltage higher than a supply voltage, comprising;

charging a transfer capacitance to a first voltage level through a first switching element during a first half cycle of oscillation of a local oscillation signal;

maintaining the first switching element in an on state during the entire first half cycle of oscillation;

transferring the charge from the transfer capacitance to a charge storage capacitance during a second half cycle of the local oscillation signal through a second switching element; and maintaining the second switching element in an on condition during the entire second half cycle of the local oscillation signal.

* * * * *